United States Patent
Fry et al.

(10) Patent No.: US 7,962,925 B2
(45) Date of Patent: Jun. 14, 2011

(54) SYSTEM AND METHOD FOR XML DATA BINDING

(75) Inventors: Chris Fry, Berkeley, CA (US); Scott Ziegler, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1026 days.

(21) Appl. No.: 10/304,353

(22) Filed: Nov. 26, 2002

(65) Prior Publication Data

US 2003/0163603 A1  Aug. 28, 2003

Related U.S. Application Data

(60) Provisional application No. 60/359,145, filed on Feb. 22, 2002.

(51) Int. Cl.
G06F 13/00 (2006.01)
G06F 9/45 (2006.01)
G06F 17/00 (2006.01)

(52) U.S. Cl. ........ 719/328; 717/136; 717/137; 717/140; 717/143; 715/236; 715/237; 715/239

(58) Field of Classification Search ............. 718/331; 715/513, 234, 237; 717/140; 719/328, 331, 719/332
See application file for complete search history.

(56) References Cited

U.S. PATENT DOCUMENTS

| | | | |
|---|---|---|---|
| 6,125,391 A * | 9/2000 | Meltzer et al. | 709/223 |
| 6,226,675 B1 * | 5/2001 | Meltzer et al. | 709/223 |
| 6,438,744 B2 * | 8/2002 | Toutonghi et al. | 717/137 |
| 6,453,464 B1 | 9/2002 | Sullivan | |
| 6,516,322 B1 | 2/2003 | Meredith | |
| 6,519,617 B1 * | 2/2003 | Wanderski et al. | 715/513 |
| 6,621,505 B1 | 9/2003 | Beauchamp et al. | |
| 6,662,342 B1 | 12/2003 | Marcy | |
| 6,901,410 B2 | 5/2005 | Marron et al. | 707/104.1 |
| 6,925,631 B2 * | 8/2005 | Golden | 717/115 |
| 7,065,579 B2 * | 6/2006 | Traversat et al. | 709/230 |
| 2001/0047385 A1 * | 11/2001 | Tuatini | 709/203 |
| 2001/0054172 A1 * | 12/2001 | Tuatini | 717/1 |
| 2001/0056504 A1 | 12/2001 | Kuznetsov | |
| 2002/0049603 A1 | 4/2002 | Mehra et al. | |
| 2002/0073399 A1 * | 6/2002 | Golden | 717/114 |
| 2002/0085020 A1 | 7/2002 | Carroll, Jr. | |
| 2002/0111963 A1 | 8/2002 | Gebert et al. | |
| 2002/0120704 A1 * | 8/2002 | Karp et al. | 709/207 |
| 2002/0122054 A1 | 9/2002 | Hind et al. | |
| 2002/0143815 A1 | 10/2002 | Sather et al. | |

(Continued)

OTHER PUBLICATIONS

Cover, Early Acess Release of Java Architecture for xml binding (JAXB), Jun. 14, 2001, p. 1-2.*

(Continued)

*Primary Examiner* — H S Sough
*Assistant Examiner* — Phuong N Hoang
(74) *Attorney, Agent, or Firm* — Fliesler Meyer LLP

(57) ABSTRACT

A schema parser can be used in data binding to create a schema object model when given an XML schema. Java classes can be generated using the schema object model, which correspond to elements and types in the schema. Mapping can be done in each direction between the schema and Java classes, which can be written to a type mapping directory. The schema object model can also contain mappings between each Java class and an XSD type. The mappings in the type mapping directory can then be used to generate XML when given a Java object tree, and can be used to create and populate a Java class when given an XML instance matching the schema object model.

27 Claims, 2 Drawing Sheets

U.S. PATENT DOCUMENTS

| | | | |
|---|---|---|---|
| 2002/0165872 | A1 | 11/2002 | Meltzer et al. |
| 2002/0184145 | A1 | 12/2002 | Sijacic et al. |
| 2003/0018661 | A1 | 1/2003 | Darugar |
| 2003/0018832 | A1* | 1/2003 | Amirisetty et al. ........... 709/328 |
| 2003/0023628 | A1 | 1/2003 | Girardot et al. |
| 2003/0055875 | A1 | 3/2003 | Carter |
| 2003/0217094 | A1 | 11/2003 | Andrews et al. |
| 2004/0019589 | A1 | 1/2004 | Basrur |
| 2004/0034830 | A1 | 2/2004 | Fuchs et al. |
| 2004/0068487 | A1 | 4/2004 | Barton et al. |
| 2004/0103373 | A1 | 5/2004 | Wei |
| 2005/0234844 | A1 | 10/2005 | Ivanov |

OTHER PUBLICATIONS

Jeckle, "DaimlerChrysler", Jun. 28, 2001, pp. 1-44.*
Cerami, "Web Services Essentials", 2001, pp. 1-32.*
Curley "Converting Java and CORBA components to a WS Reprentation", Feb. 6, 2002, pp. 1-12.*
Adak et al, "Adaptive XML/Java Data-Binding", pp. 1-11, May 2001.*
Sundsted, "Web services Distilled: Essential Guidance for Today's Web Services", pp. 1-6, Aug. 17, 2001.*
Abraham, "TopXML", Feb. 11, 2002, pp. 1-4.*
Cover, "Sun Microsystems Announces Java Architecture for XML Binding Beta Implementation", Oct. 24, 2002, p. 1-5.*
Almaer, "XML Data Binding with Castor", Oct. 24, 2001, pp. 1-5.*
Cover, Early Access Release of Java Architecture for XML Binding (JAXB), Jun. 14, 2001, pp. 1-2.*
U.S. Appl. No. 10/304,207, filed Nov. 26, 2002, Chris Fry.
U.S. Appl. No. 10/304,233, filed Nov. 26, 2002, Chris Fry.
U.S. Appl. No. 10/304,280, filed Nov. 26, 2002, Chris Fry and Sam Pullara.
"What is Server-Side", Archived Dec. 1, 2002, http://www.webopedia.com/TERM/s/server_side.html.
"Dedicated Server Glossary" Archived Dec. 15, 2001, http://www.webserverlist.com/guides/glossary.asp.
Pemberton et al., XHTML™ 1.0: The Extensible HyperText Markup Language, A Reformulation of HTML 4.0 in XML 1.0, W3C Working Draft May 5, 1999 http://www.w3.org/TR/1999/xhtml1-19990505/.
Phidani Software, XML Booster, XML.com, May 10, 2001, http://www.xml.com/pub/r/1085.
Sosnoski, Dennis M., XML Documents on the Run, Part I, Javaworld.com, Feb. 8, 2002, http://www.javaworld.com/javaworld/jw-02-2002/jw-0208-xmljava_p.html.
Sosnoski, Dennis M., XML Documents on the Run, Part II, Javaworld.com, Mar. 29, 2002, http://www.javaworld.com/javaworld/jw-03-2002/jw-0329-xmljava2_p.html.
Slominski, Aleksander and Haustein Stephan, MXP1 xml pull parser, XML.com, Apr. 29, 2002, http://www.xml.com/pub/r/1352.
Sosnoski, Dennis M., XML Documents on the Run, Part III, Javaworld.com, Apr. 26, 2002, http://www.javaworld.com/javaworld/jw-04-2002/jw-0426-xmljava3_p.html.

* cited by examiner

SYSTEM AND METHOD FOR XML DATA BINDING

CLAIM OF PRIORITY

This application claims priority to U.S. Provisional Patent Application No. 60/359,145, filed Feb. 22, 2002, entitled "SYSTEM AND METHOD FOR XML DATA BINDING", which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/304,233 entitled "SYSTEM AND METHOD FOR FAST XSL TRANSFORMATION" by Chris Fry, filed Nov. 26, 2002, now U.S. Pat. No. 7,502,996 issued Mar. 10, 2009.

U.S. patent application Ser. No. 10/304,280 entitled "SYSTEM AND METHOD FOR XML PARSING" by Chris Fry, filed Nov. 26, 2002, now U.S. Pat. No. 6,880,125 issued Apr. 12, 2005.

U.S. patent application Ser. No. 10/304,207 entitled "STREAMING PARSER API" by Chris Fry and Sam Pullara, filed Nov. 26, 2002, now U.S. Pat. No. 7,065,561 issued Jun. 20, 2006.

FIELD OF THE INVENTION

The present invention relates to the binding of data, particularly the binding of XML data.

BACKGROUND

The eXtensible Markup Language, otherwise known as XML, has become a standard for inter-application communication. XML messages passing between applications contain tags with self-describing text. This self-describing text allows messages to be understandable not only to the applications, but to humans reading an XML document as well. XML is currently used to define standards for exchanging information in various industries. These document standards are available in various forms.

Several XML-based communication protocols exist, such as the Simple Object Access Protocol (SOAP) and the ebXML protocol. The ebXML protocol is an open XML-based infrastructure that enables the global use of electronic business information. SOAP is a lightweight XML protocol, which can provide both synchronous and asynchronous mechanisms for sending requests between applications. The transport of these XML documents is usually over a lower level network standard, such as TCP/IP.

XML documents need to be valid and well-formed. An XML document is considered to be "well-formed" if it conforms to the particular XML standard. An XML document is considered valid if it complies with a particular schema. At the core of an XML document is an XML parser, which will check to verify that a document is well formed and/or valid.

The processing of XML has become a standard function in many computing environments. When parsing XML, it is necessary to get data from the XML file and transform the data such that the data can be handled by a Java application or other application running the parser. Efficient XML processing is fundamental to the server. As more and more documents become XML based, more and more traffic on the server will be in XML. The latest push into web services (with SOAP as the transport) has also highlighted the fundamental need for fast XML processing. Web services use XML over HTTP as the transport for remote procedure calls. These calls cannot be done in a timely manner if the XML parser is slow. There are primarily two standard approaches for processing XML: (1) SAX, or Simple API for XML, and (2) DOM or Document Object Model. Each protocol has its benefits and drawbacks, although SAX presently has more momentum as an XML processing API.

XML data binding is a process whereby XML documents can be bound to objects that are designed especially for the data in those documents. Data binding allows applications to manipulate data that has been serialized as XML in a way that can be more natural than DOM. Data binding can also have many cross-system dependencies. Web services and XML parsing are examples of clients or applications that can utilize data binding.

One method that is useful for XML data binding is JAXB, or the Java™ Architecture for Data Binding. JAXB compiles an XML schema into Java classes, which handle XML parsing and formatting. These generated classes also ensure that the constraints expressed in the schema are enforced in the resulting methods and Java language data types. Presently, however, there is not a solution that allows not only mapping from XML to Java, but also from Java to XML.

Castor XML is an existing, open source data binding framework for Java to XML binding. Castor enables one to deal with the data defined in an XML document through an object model which represents that data, instead of dealing with the structure of an XML document like DOM and SAX. Castor XML can marshal many Java objects to and from XML. Marshalling, and the inverse operation of unmarshalling, involves converting a stream of data, or sequence of bytes, to and from an object. Marshalling converts an object to a stream, while unmarshalling converts from a stream to an object. Castor, however, is not a complete solution for applications such as web services.

BRIEF SUMMARY

It is therefore desirable to provide a framework that can map from both XML to Java and from Java to XML.

It is also desirable to provide data binding support to web services.

It is also desirable to develop a parsing system that has increased speed and ease of use.

It is also desirable to develop a parsing system with broad support of XML specifications.

It is also desirable to develop a parsing system that has interoperability across platform versions and releases.

A system and method for data binding in accordance with one embodiment of the present invention uses a schema parser to create a schema object model when given an XML schema. Java classes can be generated using the schema object model, with the Java classes corresponding to elements and types in the schema. Mapping can be done in each direction between the schema and Java classes. This mapping is written to a type mapping directory. The schema object model can also contain mappings between each Java class and an XSD type. The mappings in the type mapping directory can then be used to generate XML when given a Java object tree, and can be used to create and populate a Java class when given an XML instance matching the schema object model.

Other features, aspects, and objects of the invention can be obtained from a review of the specification, the figures, and the claims.

DETAILED DESCRIPTION

Figure 1:
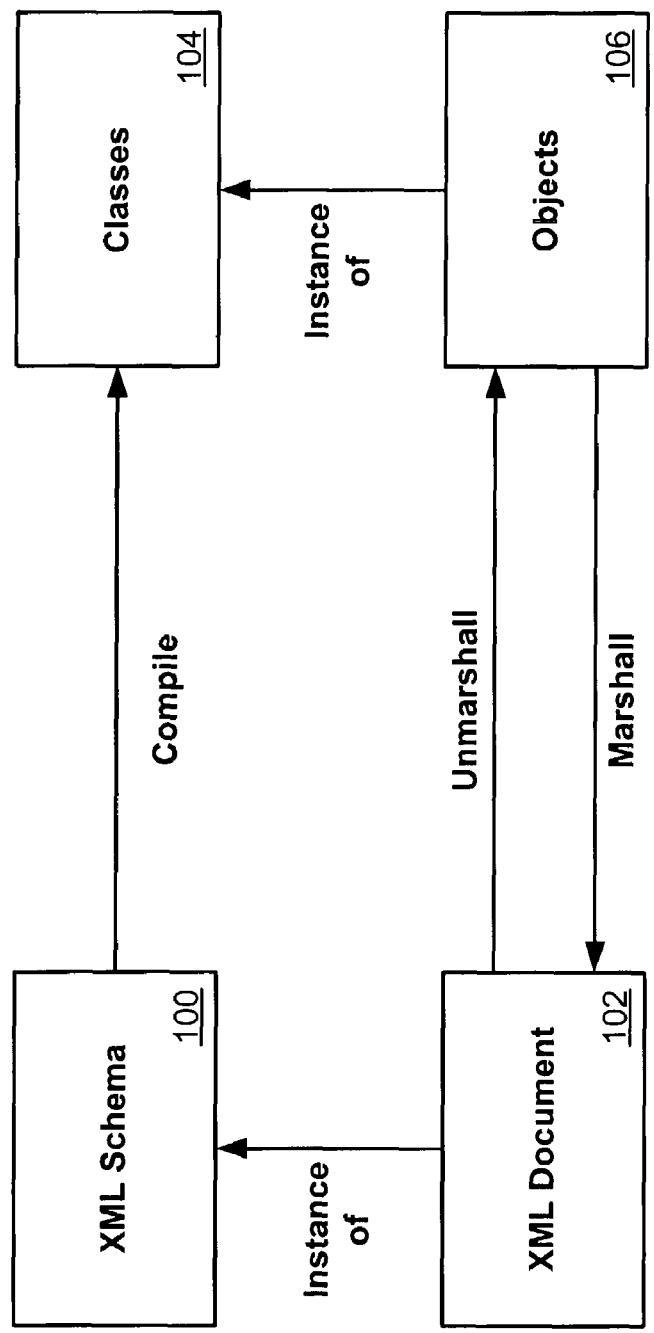
FIG. 1 is an overview of an exemplary XML data binding system in accordance with one embodiment of the present invention.

A data binding framework, or a data binding system, in accordance with one embodiment of the present invention can provide a mapping from XML to Java and from Java to XML. Such a framework can be based, at least in part, on Castor and JAXB. XML schema can be used as a syntax definition for the framework. Multiple modes can be supported, such as may include 'fully code generated' mode and 'fully interpreted' mode. The framework can bind to provided classes and can make use of a generic API. The framework can also provide validation of XML content, and can support a subset of an application runtime. There may be no inheritance required in the user code. This approach can provide acceptable performance, such as being able to work within a Java Remote Method Invocation (RMI) type timeframe to allow Remote Procedure Call (RPC) style invocations, such as under 10 ms. The system can utilize a configuration with a binding schema file, and can offer interoperability with systems such as .NET and IBM.

For web services, XML binding requirements at runtime can include the creation of Web Service Definition Language (WSDL) code from an existing remote Java interface. A schema can be generated for complex Java data types. Primitive types can also be mapped to XML Schema Definition language (XSD) types. XSD is an XML-based grammar that can be used to describe the structure of an XML document. A schema-aware validating parser can validate an XML document against an XSD schema and can report any discrepancies. The system can handle arrays and collection classes. The schema should be generated using some default rules. The user can have some control over the schema generation. The Java interface and data classes can be generated from WSDL. The system can convert XSD data types to Java and can generate Java classes for complex XML types. A user can choose a package for generated Java classes. A user can also recreate a schema from the generated classes.

For an XML to Java case, a given namespace and element name user can get the appropriate Java classes at runtime in a mode such as generated mode. Given the stream and class, a user can get the populated java instance. The user can also have control over the deserialization. For a Java to XML case, the primitives can be mapped to XSD types. The user can also specify the XSD type. The system can convert the java instance to an XML stream or to a tree, such as a DOM tree.

At runtime in dynamic mode, a system can read schema specified in WSDL. The system can also validate incoming XML documents using this schema. The system can create and manipulate XML using an API such as a DOM API or streaming parser API.

According to the JAXB specification, an XML data binding facility can contain a schema compiler able to bind an input schema to a Java class. The binding facility can also provide a binding framework that can utilize a runtime API supporting certain primary operations, such as unmarshalling, marshalling, and validation. An unmarshalling operation can map an XML document into a tree of existing and schema-derived classes. A marshalling operation can map content trees back to XML documents. A validation operation can validate content trees against schemas.

A system utilizing these operations is shown in FIG. 1. In this system, an input XML schema 100 can be compiled into at least one Java class 104. Marshalling can be used to map an XML document 102 to a class tree or Java object 106, and unmarshalling can be used to map the Java object 106 to an XML document 102. When unmarshalling, binding can be used by feeding an XML stream for an instance of an XML document to generated classes 104, which can create and fill Java objects 106. When marshalling, an instance of a Java object 106 can be fed to generated classes 104.

Figure 2:
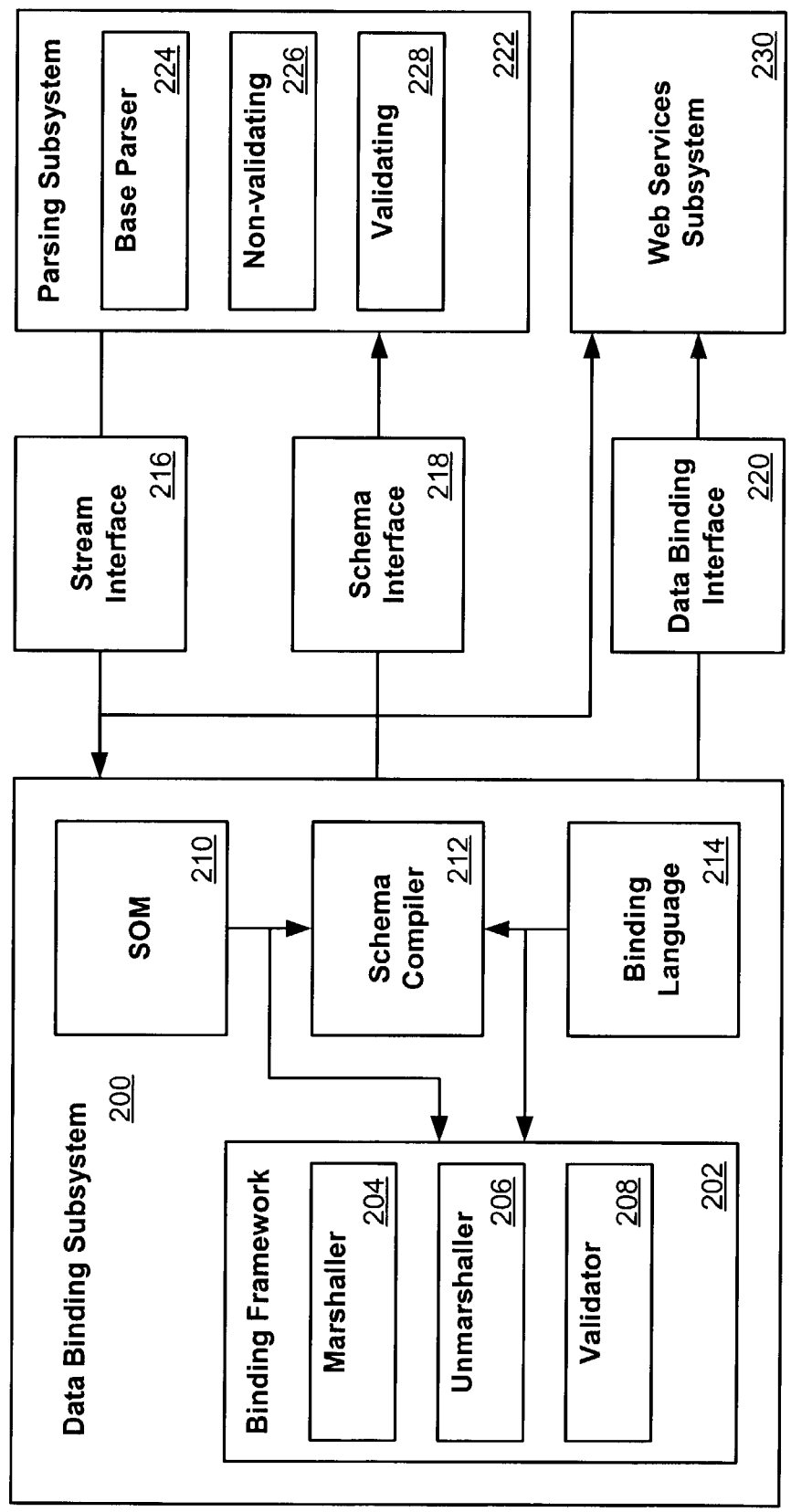
FIG. 2 is an illustration of different components in an exemplary XML data binding system in accordance with one embodiment of the present invention.

Components of a system that can be useful for XSD/Java databinding are shown in FIG. 2. A data binding subsystem 200 is shown, which includes a SOM instance 210, a schema compiler 212, an instance of the binding language 214, and a binding framework 202. The binding framework 202 itself can include a marshaller 204, an unmarshaller 206, and a validator 208. The system also utilizes a parsing subsystem 222, which includes a base parser 224, a non-validating parser 226, and a validating parser 228. A parsing subsystem can be similar to that described in U.S. patent application Ser. No. 10/304,280, now U.S. Pat. No. 6,880,125 issued Apr. 12, 2005 entitled "SYSTEM AND METHOD FOR XML PARSING" to Chris Fry et al. The data binding subsystem can communicate with the parsing subsystem through a stream interface 216 and a schema interface 218. The system can also include a web services subsystem 230, which can communicate with the data binding subsystem 200 through a data binding interface 220.

The schema object model, or SOM, is a java object model that can read or write any valid XML schema document, verify its validity, and allow easy programmatic manipulation of schema documents. A schema parser can parse an XML schema and create a schema object model. A schema writer can take a SOM and output an XML schema representation.

For each construct in SOM, there can be a corresponding interface. All generated classes can implement these interfaces. It is possible to write general parsing and XML output routines in terms of these interfaces, thereby leaving all such code out of the generated classes. There can be generic implementations of these interfaces that can be used in the dynamic case, where users of the data binding will not have enough information about the schema to write to a Java interface that is a direct mapping of the schema. These generic classes can implement enough of the DOM interfaces to allow processing through XSLT or other appropriate tools.

Given a SOM and an optional binding specification, a schema compiler can output a collection of java classes or interfaces that map the complex types and elements described in the schema into Java classes.

The binding process can be configurable. This can allow an XML Path language (XPath) expression or other similar expression on the schema to specify bindings at specific nodes in the schema. A marshaller can take a tree of java objects and output valid XML. An unmarshaller can parse an XML instance of a schema document and generate or fill in an object tree.

Generally speaking, data binding can happen at compile time or at runtime. At runtime, an arbitrary schema can be received, such as from WSDL, and the system can access the XML data from an instance document in a generic fashion. Generating java classes may not be feasible in this case, as the user of the generated classes may not know which methods to call.

In a dynamic situation, a schema parser can be used to create a SOM and set up data binding if the parser is given an XML schema. Using generic XSD objects, one or more object trees can be created that are based on the SOM. To use binding with unmarshalling, an empty object tree can be obtained or cloned, the XML instance can be parsed using general classes, and the object tree can be filled in. If marshalling, an XSD instance XML writer can be used for output, and can do some validation in the process.

For a code-generation situation, binding can be set up by first using a schema parser to create a SOM when given an XML schema. Using this SOM, Java classes can be generated that correspond to elements and complex types in the schema. The mapping in both directions can be entered into a type mapping directory, from complex types to Java classes. The generated classes can implement the DOM interfaces and generic XSD object interfaces, and may not contain any parsing code. An XSD instance parser can be initiated with the generated SOM, which can prefill various hashes. A pool of empty object trees can be created that are ready to be filled. An XSD instance XML writer can be instantiated with prefilled data structures that are ready to output XML when given an object tree. For unmarshalling, an empty object instance tree can be cloned, created, or obtained from a pool of objects for use in binding. The instantiated XSD instance parser can be used to parse the code and fill in the empty object tree.

For a code generation case where Java classes are given, binding can be set up by reflecting on Java classes, building a SOM that contains mappings of each class into an XSD complex type or simple type.

The same basic procedure can be used as when starting with an XML schema. Each generated class can contain a static method that can take an XML instance of that schema type, and can create and populate the given Java class. There may be no need to create an intermediate tree of code-generated objects.

When unmarshalling, binding can be used by feeding an XML stream to generated classes, which can create and fill Java objects. When marshalling, an instance of a Java object can be fed to generated classes.

There can be at least two choices at this point. Generated object instances for DOM type manipulations can be created, or an XML stream can be created directly out of the Java classes, bypassing any intermediate object creation.

For a code generation case where both Java classes and XML schema are given, binding can be set up as described above, except that a smarter binding dictionary can be generated. Implicit in all these cases is the use of a binding specification that can be used to customize the process. All these implementations can use a streaming parser, such as is described in U.S. Provisional Application No. 60/362,773 entitled "STREAMING PARSER API," by Chris Fry et al.

SOM can be implemented as a set of Java classes that extend from a generic XSD object class. A schema object can contain a catalog of types, both complex and simple, as well as model group definitions and element objects. These classes can somewhat directly model various schema components. A schema parser can contain all the necessary parsing code to take an XML schema and create a SOM. Similarly, a schema writer can take a SOM and output an XML schema. The SOM classes may not contain any parsing logic.

The following example includes code to create a SOM with one element of complexType "someType":

```
Schema schema = new Schema( );
schema.setTargetNamespace("http://www.foo.com");
ComplexType ct = new ComplexType( );
ct.setLocalName("some Type");
ct.setParent(schema);
schema.addComplexType(ct);
ModelGroup mg = new ModelGroup( );
mg.setParent(ct);
ct.setContentModel(mg);
Element int_el = new Element( );
ct.setLocalName("some_integer");
int_el.setType(new ExpName(SchemaTypes.SCHEMA_NS,
    SchemaTypes.XSD_INT));
mg.addParticle(int_el);
mg.setMaxOccurs(2);
Element el = new Element( );
el.setParent(schema);
el.setType(ct.getExpName( ));
el.setMinOccurs(4); // particle
schema.addElement(el);
// is this schema valid?
schema.validate( );
SchemaDumper d = new SchemaDumper(schema);
d.walkSchema( );
```

For each class in the SOM, there can be a corresponding Instance class that can hold an instance of a schema component. Each such instance object can hold a reference to the SOM Object that it represents. Given that the most common case can be receipt of many instance documents after initial receipt of a schema, it is possible, using the knowledge of the schema, to precreate much of the object tree in an empty state. The empty trees can then be cloned when a new tree is needed, or possibly pooled, to avoid some of the overhead involved going from an XML instance of a schema to java objects. Given a fully instantiated object tree, it only remains to call the appropriate setters on the leaf nodes to fill in the actual data. Some schema constructs may not be able to be fully allocated in advance. These instance classes can implement the DOM interfaces to allow XSLT and other tools to operate.

Code generation can be limited to the generation of interfaces. These interfaces can be implemented using dynamic proxies that can dispatch calls to the generic XSD object instances. This can allow all the parsing and XML output code to be reused.

Part of the binding process can involve mapping XML names to the more restrictive space of Java names. JAXB outlines an algorithm and approach that can generally be followed. In order to achieve a true round trip from XML to Java and back, the original XML name may need to be stored in the generated or dynamic classes, or perhaps in the mapping directory.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system for data binding, comprising:
   a microprocessor;
   a schema object model, wherein the schema object model is an object oriented programming language object model that directly models a schema that includes one or more schema definition language types based on a schema definition language, and wherein the schema object model allows manipulation of schema documents in the schema definition language, wherein the schema object model programmatically creates at least one new schema definition language type in the schema based on the one or more schema definition language types pre-defined in the schema definition language, wherein the at least one new schema definition language type is not pre-defined in the schema definition language, and wherein the schema object model supports a pool of empty object trees that are ready to be filled with one or more object oriented programming language objects based on the schema;
   a schema compiler adapted to accept the schema associated with an Extensible Markup Language (XML) document and generate a set of interfaces that map the one or more schema definition language types of the schema into object-oriented programming language classes using the schema object model with the pool of empty object trees; and
   an Application Programming Interface (API) to map between the XML document and the object-oriented programming language classes based on at least one empty object tree from the pool of empty object trees.

2. A system according to claim 1, wherein said API is further capable of mapping between the XML document and a content tree of at least one of existing and schema-derived object-oriented programming language classes.

3. A system according to claim 2, wherein said API is further capable of validating the content tree against the schema.

4. A system according to claim 1, further comprising a parser for parsing the XML document for mapping.

5. A system according to claim 1, wherein said schema compiler is adapted to accept a pre-defined schema.

6. A system according to claim 5, wherein said API is further capable of validating the XML document against the pre-defined schema and reporting any discrepancies.

7. A system according to claim 1, wherein said schema compiler adapted to accept Web Service Definition Language (WSDL) code to be used in generating the set of interfaces and object-oriented programming language classes.

8. A system according to claim 1, further comprising a parser API for generating XML to be mapped to object-oriented programming language classes.

9. A system according to claim 1, further comprising a web services subsystem for supporting web services.

10. A system according to claim 1, further comprising a schema parser for parsing the schema and generating the schema object model.

11. A system according to claim 10, further comprising a schema writer for taking the schema object model and generating an XML schema representation.

12. A system according to claim 1, further comprising a type mapping directory, containing the mapping between types in the schema and the generated classes.

13. A system according to claim 12, wherein the generated classes implement Document Object Model (DOM) interfaces and generic pre-defined object interfaces.

14. A system according to claim 13, further comprising a pool of empty object trees based on the generated classes.

15. A system according to claim 14, further comprising an XML writer adapted to use said pool of empty object trees to output XML when given an object tree.

16. A system according to claim 13, wherein said API can clone an object tree for use in binding.

17. A system according to claim 1, further comprising an instance parser that can be initiated with the schema object model and can prefill data structures.

18. A system according to claim 1, further comprising a XML Schema Definition (XSD) instance writer adapted to use a type mapping directory and prefilled data structures to output XML when given an object tree.

19. A system according to claim 1, wherein each of the generated object-oriented programming language classes can take an XML instance and populate the appropriate object-oriented programming language class, using a static method.

20. A system according to claim 1, wherein the at least one new type is a complex schema definition language type that is created using the object oriented programming language at runtime, wherein the at least one new type contains one or more schema definition language types pre-defined in the schema definition language.

21. A computer-implemented method for data binding, comprising:
   using a schema parser to create a schema object model when given an Extensible Markup Language (XML) schema that is associated with an XML document, wherein the schema object model is an object oriented programming language object model that directly models schema components based on a schema definition language and allows manipulation of schema documents, wherein the schema object model programmatically creates at least one new type based on one or more types pre-defined in the schema definition language, wherein the at least one new schema definition language type is not pre-defined in the schema definition language, and wherein the schema object model supports a pool of empty object trees that are ready to be filled based on the schema;
   generating a set of interfaces that map the one or more schema definition language types of the schema into object-oriented programming language classes using the schema object model with the pool of empty object trees; and
   mapping between the XML document and the object-oriented programming language classes.

22. A method according to claim 21, wherein said schema object model contains mappings between each object-oriented programming language class and a XML Schema Definition (XSD) type.

23. A method according to claim 22, further comprising using the mapping in the type mapping directory to generate XML when given a object-oriented programming language object tree.

24. A method according to claim 22, further comprising using the mapping in the type mapping directory to create and populate a object-oriented programming language class when given an XML instance matching the schema object model.

25. A computer storage medium storing computer program instructions, when executed by a processor, performing a method comprising:

using a schema parser to create a schema object model when given an Extensible Markup Language (XML) schema that is associated with an XML document, wherein the schema object model is an object oriented programming language object model that directly models a schema that includes one or more schema definition language types based on a schema definition language, and wherein the schema object model allows manipulation of schema documents in the schema definition language, wherein the schema object model programmatically creates at least one new schema definition language type in the schema based on the one or more schema definition language types pre-defined in the schema definition language, wherein the at least one new schema definition language type is not pre-defined in the schema definition language, and wherein the schema object model supports a pool of empty object trees that are ready to be filled with one or more object oriented programming language objects based on the schema;

generating a set of interfaces that map the one or more schema definition language types of the schema into object-oriented programming language classes using the schema object model with the pool of empty object trees; and mapping between the XML document and the object-oriented programming language classes.

26. A computer program product stored on a computer-storage medium that when executed by a microprocessor cause a system to perform the steps of:

using a schema parser to create a schema object model when given an Extensible Markup Language (XML) schema that is associated with an XML document, wherein the schema object model is an object oriented programming language object model that directly models a schema that includes one or more schema definition language types based on a schema definition language, and wherein the schema object model allows manipulation of schema documents in the schema definition language, wherein the schema object model programmatically creates at least one new schema definition language type in the schema based on the one or more schema definition language types pre-defined in the schema definition language, wherein the at least one new schema definition language type is not pre-defined in the schema definition language, and wherein the schema object model supports a pool of empty object trees that are ready to be filled with one or more object oriented programming language objects based on the schema;

generating a set of interfaces that map the one or more schema definition language types of the schema into object-oriented programming language classes using the schema object model with the pool of empty object trees; and mapping between the XML document and the object-oriented programming language classes and writing the mapping to a type mapping directory.

27. A computer system comprising:

a processor;

object code executed by said processor, said object code configured to:

use a schema parser to create a schema object model when given an Extensible Markup Language (XML) schema that is associated with an XML document, wherein the schema object model is an object oriented programming language object model that directly models a schema that includes one or more schema definition language types based on a schema definition language, and wherein the schema object model allows manipulation of schema documents in the schema definition language, wherein the schema object model programmatically creates at least one new schema definition language type in the schema based on the one or more schema definition language types pre-defined in the schema definition language, wherein the at least one new schema definition language type is not pre-defined in the schema definition language, and wherein the schema object model supports a pool of empty object trees that are ready to be filled with one or more object oriented programming language objects based on the schema;

generate a set of interfaces that map the one or more schema definition language types of the schema into object-oriented programming language classes using the schema object model with the pool of empty object trees; and map between the XML document and the object-oriented programming language classes and writing the mapping to a type mapping directory.

* * * * *

UNITED STATES PATENT AND TRADEMARK OFFICE
CERTIFICATE OF CORRECTION

| | | |
|---|---|---|
| PATENT NO. | : 7,962,925 B2 | Page 1 of 1 |
| APPLICATION NO. | : 10/304353 | |
| DATED | : June 14, 2011 | |
| INVENTOR(S) | : Fry et al. | |

It is certified that error appears in the above-identified patent and that said Letters Patent is hereby corrected as shown below:

On the Title Page, under "Other Publications", line 1, delete "Acess" and insert -- Access --, therefor.

On Title page 2, under "Other Publications", line 3-4, delete "Reprentation" and insert -- Representation --, therefor.

In column 5, line 5, delete "runtme," and insert -- runtime, --, therefor.

In column 5, line 41-46, delete "The same basic procedure............code-generated objects." and insert the same on Col. 5, Line 40, after "type." as a continuation of the same paragraph.

In column 5, line 51-54, delete "There can be.............object creation." and insert the same on Col. 5, Line 50, after "classes." as a continuation of the same paragraph.

Signed and Sealed this
Twenty-fifth Day of October, 2011

David J. Kappos
*Director of the United States Patent and Trademark Office*